US012668511B2

(12) United States Patent
Kolev et al.

(10) Patent No.: US 12,668,511 B2
(45) Date of Patent: Jun. 30, 2026

(54) COMPOSITION WITH SHELL AND CORE FOR REMOVAL OF IONIC CONTAMINANTS

(71) Applicant: UOP LLC, Des Plaines, IL (US)

(72) Inventors: Evgeny T. Kolev, Arlington Heights, IL (US); Dean E. Rende, Arlington Heights, IL (US); Tsukasa Tamai, Sagamihara (JP)

(73) Assignee: UOP LLC, Des Plaines, IL (US)

( * ) Notice: Subject to any disclaimer, the term of this patent is extended or adjusted under 35 U.S.C. 154(b) by 1018 days.

(21) Appl. No.: 17/804,526

(22) Filed: May 27, 2022

(65) Prior Publication Data

US 2022/0380229 A1 Dec. 1, 2022

Related U.S. Application Data

(60) Provisional application No. 63/195,074, filed on May 31, 2021.

(51) Int. Cl.
*C02F 1/28* (2023.01)
*B01J 20/28* (2006.01)
(Continued)

(52) U.S. Cl.
CPC ........... *C02F 1/28* (2013.01); *B01J 20/28004* (2013.01); *B01J 20/28019* (2013.01);
(Continued)

(58) Field of Classification Search
CPC .. C02F 1/28; C02F 2101/006; C02F 2101/20; C02F 2303/18; C02F 1/288; C02F 1/42;
(Continued)

(56) References Cited

U.S. PATENT DOCUMENTS 5,286,370 A * 2/1994 Chu ...................... C10G 11/05
208/120.25
6,972,095 B1 12/2005 Bushart et al.
(Continued)

FOREIGN PATENT DOCUMENTS

CN 105597661 A 5/2016
CN 111135875 A 5/2020
(Continued)

OTHER PUBLICATIONS

Synthesis of potassium metal ferrocyanide/Al-MCM-41 with fast and selective adsorption of cesium (Year: 2020).*
(Continued)

*Primary Examiner* — Ekandra S. Miller-Cruz

(57) ABSTRACT

A composition for selectively removing a first ionic contaminant from a wastewater stream. The composition is formed into a particle. The composition includes a core formed of a non-active material relative to the first ionic contaminant, and, a shell formed from an active material relative to the first ionic contaminant, wherein the active material comprises between 10 to 50 wt % of the particle. The shell may also include a binder material that may be non-active relative to the first ionic contaminant, but active relative to a second ionic contaminant. The core may be formed from a glass-forming material so that a vitrification process may be used for the spent solid waste.

17 Claims, 5 Drawing Sheets

(51) Int. Cl.
    *C02F 101/00*     (2006.01)
    *C02F 101/20*     (2006.01)

(52) U.S. Cl.
    CPC .... *C02F 2101/006* (2013.01); *C02F 2101/20* (2013.01); *C02F 2303/18* (2013.01)

(58) Field of Classification Search
    CPC ....... C02F 1/281; C02F 1/62; B01J 20/28004; B01J 20/28019; B01J 20/3291; B01J 20/0211; B01J 20/0251; B01J 20/12
    USPC ......................................................... 210/661
    See application file for complete search history.

(56) References Cited

U.S. PATENT DOCUMENTS

| | | | |
|---|---|---|---|
| 9,682,369 | B2 | 6/2017 | Kolev |
| 2014/0042068 | A1 | 2/2014 | Namiki |
| 2015/0231598 | A1 | 8/2015 | Zhao et al. |
| 2016/0141058 | A1 | 5/2016 | Barker et al. |
| 2018/0186662 | A1 | 7/2018 | Barker et al. |
| 2021/0077980 | A1 | 3/2021 | Yang et al. |
| 2021/0154641 | A1 | 5/2021 | Mathur et al. |

FOREIGN PATENT DOCUMENTS

| | | | |
|---|---|---|---|
| EP | 2198946 | A1 | 12/2008 |
| JP | 2004151600 | A | 5/2004 |
| JP | 2012061407 | A | 3/2012 |
| JP | 2012237740 | A | 12/2012 |
| KR | 101993682 | B1 | 6/2019 |

OTHER PUBLICATIONS

Mnasri-Ghnimi, Removal of heavy metals from aqueous solutions by adsorption using single and mixed pillared clays (Year: 2019).*
International Search Report from corresponding PCT application No. PCT/US2022/072648 mailed on Sep. 21, 2022.
Written Opinion from corresponding PCT application No. PCT/US2022/072648 mailed on Sep. 21, 2022.
Extended European Search Report from corresponding European application No. 22817016 dated Sep. 25, 2025.
Hee-Man Yang et al., Hollow flower-like titanium ferrocyanide structure for the highly efficient removal of radioactive cesium from water, Chemical Engineering Journal 392 (2020) 123713.
Bram Verbinnen et al., Removal of Molybdate Anions from Water by Adsorption on Zeolite-Supported Magnetite, Water Environment Research, vol. 84, No. 9, Sep. 2012, pp. 753-760.

\* cited by examiner

COMPOSITION WITH SHELL AND CORE FOR REMOVAL OF IONIC CONTAMINANTS

RELATED APPLICATIONS

This application claims priority to U.S. Provisional Patent Application Ser. No. 63/195,074, filed on May 31, 2021, the entirety of which is incorporated herein by reference.

FIELD

This invention relates generally to compositions for nuclear remediation, and more particularly relates to such compositions with better utilization of active adsorptive material.

BACKGROUND

Ion exchange compositions are well known and include molecular sieves, clays, and non-porous inorganic oxides. These compositions are typically synthesized as powders and formed into shaped articles, such as beads, extrudates, pellets, pills, and the like, in order to be commercially useful. When formed into its final shape, the articles must possess sufficient physical strength to withstand abrasion or attrition and fracture during use, loading and transit.

These compositions can be used to remove selected ion species from wastewater, by providing particles having the active materials and flowing the wastewater (with contaminants) passed the particles so the contaminants are likely to contact the particles. In many conventional applications, the compositions are loaded in ion exchange columns and the treated waste passes through them. The utility of such materials is measured by the amount of contaminants removed and the dispersion of the contaminant mass transfer zone through the adsorbent bed. The latter is governed to a great extent by the active phase selectivity and the diffusivity through the particles.

There is a growing need for a more efficient sorbent utilization in the remediation of liquid nuclear waste driven by the need for cost reduction and radioactive solid waste minimization. The sorbents should maintain high selectivity to allow a narrow mass transfer zone while maintaining controllable capacity to prevent overloading of the ion exchange columns and shifting to a higher classification as a solid waste. The solid nuclear waste in many legislations is required to be vitrified through several high-risk steps. A material with intrinsic properties allowing for less risky and less volume forming glassified waste will give safer process, lower cost and long-term storage advantages.

The structural and chemical stability of some of the existing inorganic sorbents have been a concern in the past, as they had led to operational problems and failures. Ways to increase their strength or minimize leaching of their components into the solution can address these concerns.

Therefore, there remains a need for compositions which effectively and efficiently remove contaminants from a wastewater stream.

SUMMARY

A new composition for selectively removing contaminants from a wastewater stream has been invented. The new composition allows an increased efficiency and improved selectivity compared to the existing commercial sorbents based on the same active phase. The outcome is reduced overall cost of treatment in comparison with the currently used products.

The new composition relies on the use of a core-shell based approach in which the active phase is the outer layer. The thickness of the layer and the level of the active component may be adjusted and selected based on desired use as these two attributes are not linearly correlated with performance.

The shape and type of the core may be adjusted and selected based on desired use. For example, it is believed that in some instances the use of an irregular, or non-spherical, shape has been found to provide additional accessible surface area compared to a sphere. The core may be a material which can be a glass-former. This will allow the composition, once loaded, to be converted by a vitrification process. The core may be an active phase adsorbing a secondary contaminant at higher concentration. For example, a granular shaped chabazite core covered with a shell including titanate or titanosilicate, such as monosodium titanate (MST), may be a useful material for waste high in cesium and containing strontium as well.

Since the core materials can be selected to be a narrow particle (compared with a conventional particle with similar amounts of active material) and distribution before the shell is added, the final product will be of equivalent distributions leading to better flow properties. At the same time, the loses associated with the formation of tiny (~0.5 mm) beads will be decreased leading to further cost savings both from a raw materials standpoint and manufacturing time. A binder may be included in the shell. For example, an oxide may be used which allows for use of an as-synthesized crystalline silicotitanates (CST) powder and which will provide the shell with additional selectivity towards a contaminant.

Therefore, the present invention may be characterized, in at least one aspect, as providing a composition for selectively removing a first ionic contaminant from a wastewater stream. The composition is formed into a particle and includes a core of a non-active material relative to the first ionic contaminant and a shell formed from an active material relative to the first ionic contaminant. The active material comprises between 10 to 50 wt % of the particle. The shell may further include a binder. The shell may have between 0.1 to 40 wt % of the binder. The particle may have a median diameter size between 2.1 to 0.4 mm. The particle may have a spherical shape or a non-spherical shape. The shell may have a thickness between 20 to 100 μm. The first ionic contaminant may be selected from a group consisting of: cesium, strontium, mercury, silver, lead, transition metal, iodine, lanthanide and actinide metal ions. The core, or the binder, or both may be active relative to an ionic contaminant in the wastewater stream, the ionic contaminant may be the same or different from the first ionic contaminant. The ionic contaminant may also be selected from a group consisting of: cesium, strontium, mercury, silver, lead, transition metal, iodine, lanthanide metal, and actinide metal ions. The core may include or be formed from a material configured to be subjected to a vitrification process without releasing the first and/or the second ionic contaminants. The shell may include a material selected from a group consisting of: a metallotitanate, a metallogermanate, a pillared clay, a metal phosphonate, and combinations thereof. The binder may be a hydroxyl metal oxide. The core may be a material selected from a group consisting of: ceramic, silica, alumina, titania, zirconia, silicates, titanates, zeolites, and combinations thereof.

In a second aspect, the present invention, broadly, may be characterized as providing a composition for selectively removing a first ionic contaminant from a wastewater stream. The composition may be formed into a particle and includes a core of a non-active material relative to the first ionic contaminant and a shell formed from an active material relative to the first ionic contaminant and a binder. The shell may include between 0.1 to 40 wt % of the binder and the active material may account for between 10 to 50 wt % of the particle. The shell may be between 10 to 30 wt % binder. The binder may be active relative to an ionic contaminant in the wastewater stream, and the ionic contaminant may be different or the same from the first ionic contaminant. The core may be a material configured to be subjected to a vitrification process without releasing the first and/or the second ionic contaminants. The particle may have a median diameter size between 2.1 to 0.4 mm. The shell may have a thickness between 20 to 100 µm.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION

As mentioned above, a new composition has been invented which utilizes the engineered design of a core-shell particle to increase the active phase utilization. In addition to the core-shell, the shape and size of the particle allow to external surface area and hence performance to be adjusted. The new composition also allows for selected binders having desired properties (such as selectivity to a second contamination). Compared with conventional materials, the new compositions are believed to have better attrition and leachability characteristics—providing improved performance and safety benefit. Additionally, the present compositions may use a core formed with a glass-forming precursor for facilitated vitrification. Finally, the present composition uses less active material compared with conventional designs (without reducing performance), thus, limiting and controlling the nuclear waste classification of the spent material while maintaining kinetic properties.

With these general principles in mind, one or more embodiments of the present invention will be described with the understanding that the following description is not intended to be limiting.

Figure 1:
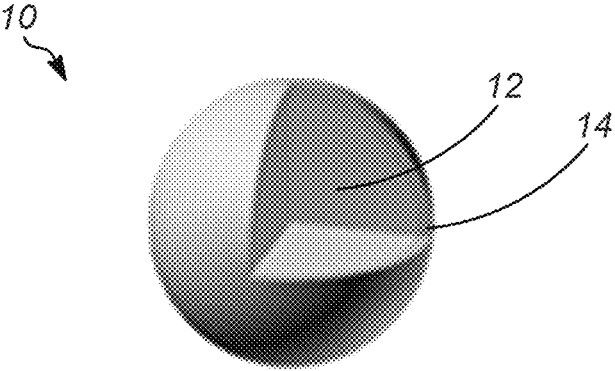
FIG. 1 is a partial cutaway view of a particle according to one or more aspects of the present invention.
Figure 2:
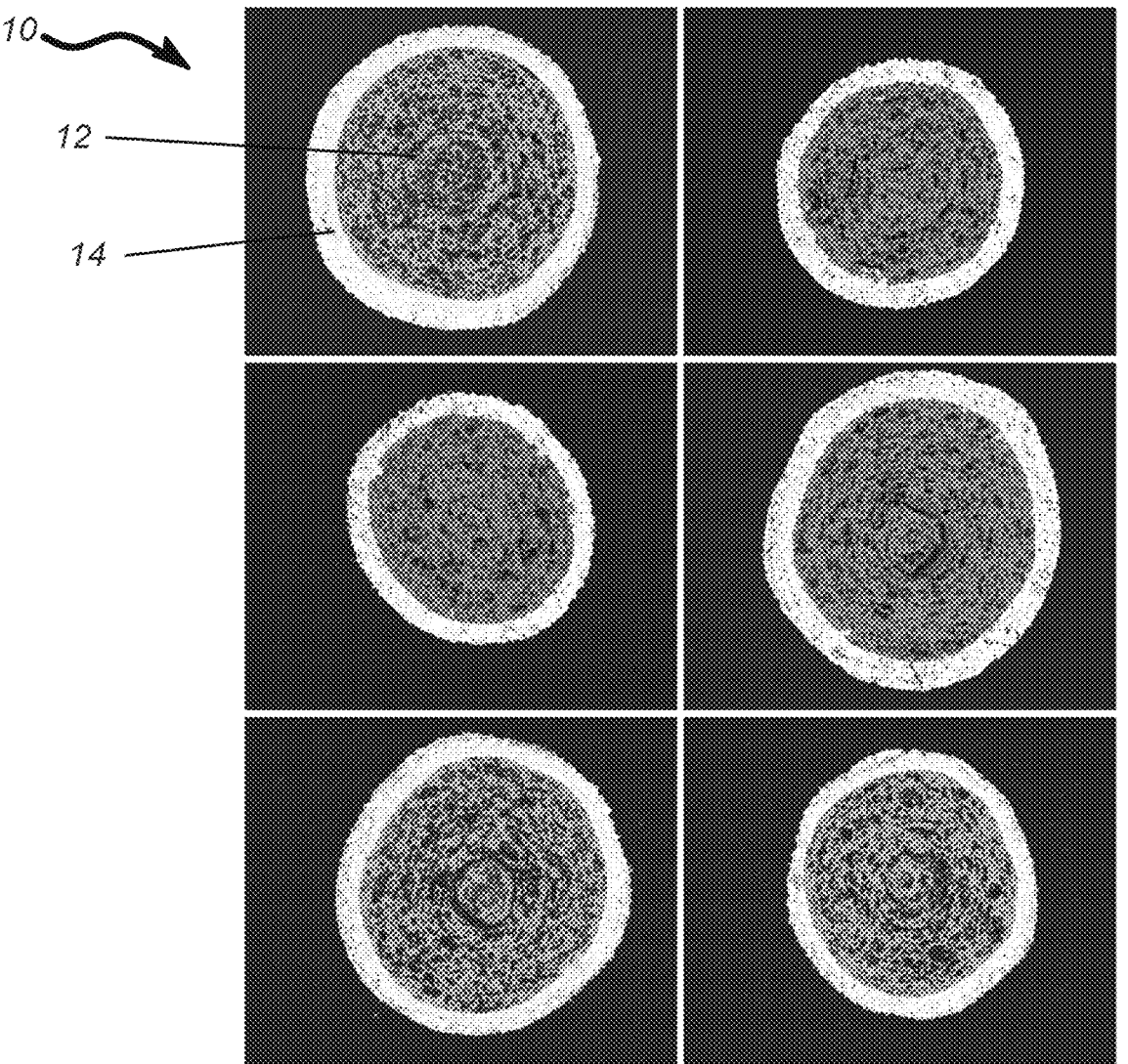
FIG. 2 is cutaway images of spherical particles according to one or more aspects of the present invention.
Figure 3:
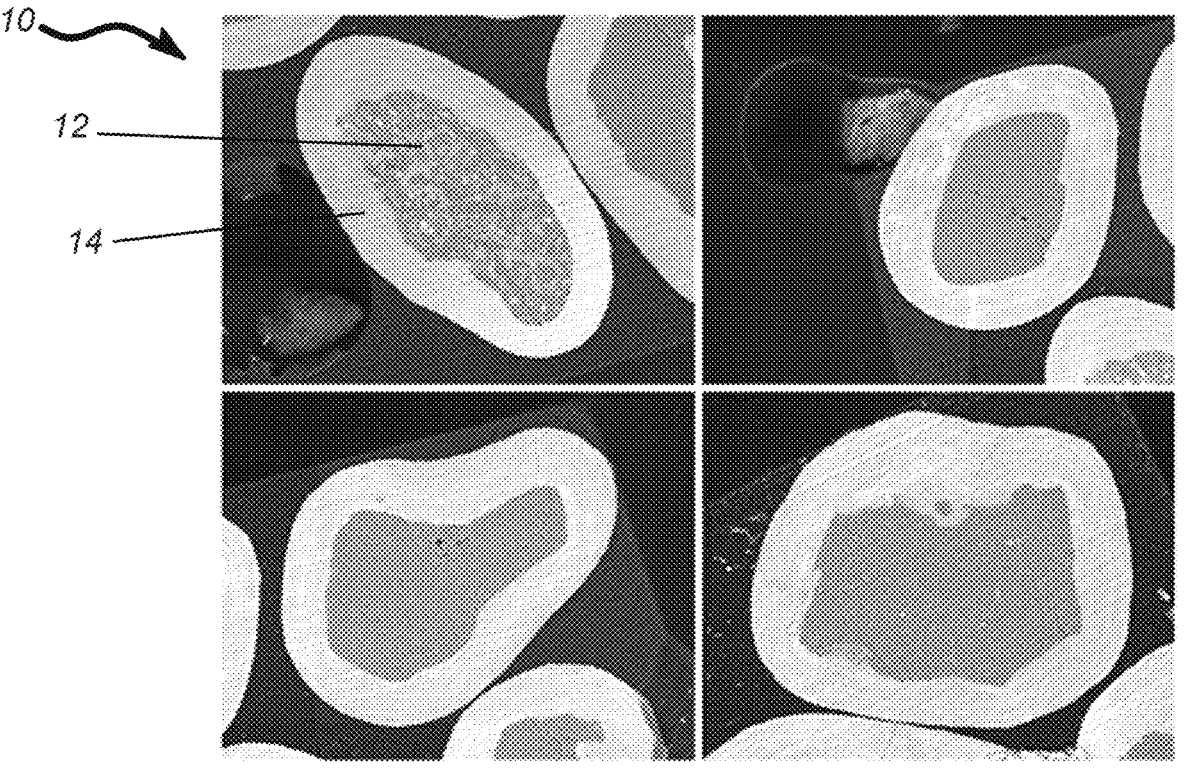
FIG. 3 is cutaway images of non-spherical particles according to one or more aspects of the present invention.

As shown in FIGS. 1 to 3, the present invention provides a composition that is in the form of a particle 10. The particle 10 has a core 12 and a shell 14 surrounding the core 12.

FIGS. 2 and 3 shows examples of selection of the core 12 not only with specific size and shape but also porosity. They also have different chemical properties targeting different additional roles played by the material of the core 12.

The shell 14 is formed from an active material relative to a selected or particular ionic contaminant and may further include a binder or binder material. The core 12 and the binder may be a non-active material relative to the particular contaminant. As used herein, an "active material" refers to a composition that is able to selectively exchange an ion present in its structure for one in a feed stream that contacts the present composition. A "non-active material" is a material that will not selectively exchange an ion present in its structure for the same targeted ionic species. Thus, one material may be "non-active" relative to a particular species, but "active" relative to another. Therefore, it should be understood that the core 12 and the binder may be active materials relative to a different contaminant. In this way, the particle 10 may be used to remove both a first and a second contaminant.

The active material of the shell 14 is between 10 to 50 wt % of the particle 10. Alternatively, the amount may be between 20 to 50 wt % of the particle 10, 20 to 40 wt % of the particle 10, or between 25 to 35 wt % of the particle 10, or between 28 to 33 wt % of the particle 10. If a binder is present in the shell 14, it is contemplated that the binder is between 0.1 to 40 wt % of the shell 14, preferably between 10 to 30 wt % of the shell 14.

Figure 4:
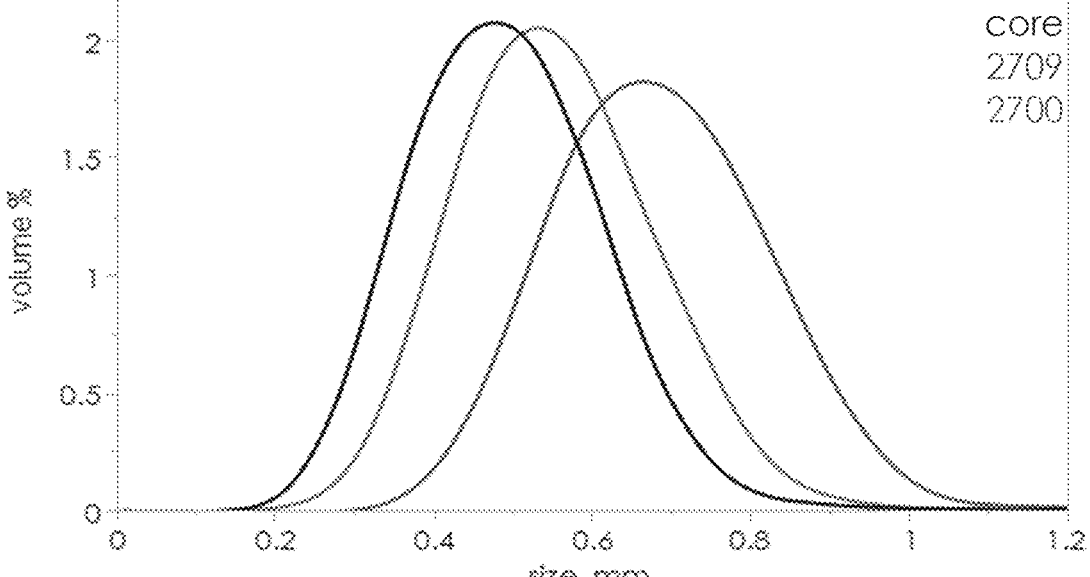
FIG. 4 is a graph showing final composition size relative to core size for a specific targeted layer thickness; and, FIG. 5 shows two differently sized particles, having same amount of active phase material.

The thickness of the shell 14 can be varied between 10 and 200 µm. It can more specifically be in the range 20 to 100 µm. Expressed as percent of the core 12 radius it can be anywhere in the range between 5 and 50% of a radius of the core 12. FIG. 4 shows a core 12 with two different shells 14 grown on it. Starting with an average core diameter of 480 µm, material 2709 was prepared with a shell 14 having a thickness of 31 µm, equivalent to 13% of the radius of the core 12. Alternatively, material 2700 using the same core 12 was prepared with a shell 14 having a thickness of 98 µm or 41% of the radius of the core 12. The size(s) of the core 12 can be selected for a specific desired thickness of the shell 14.

Figure 5:
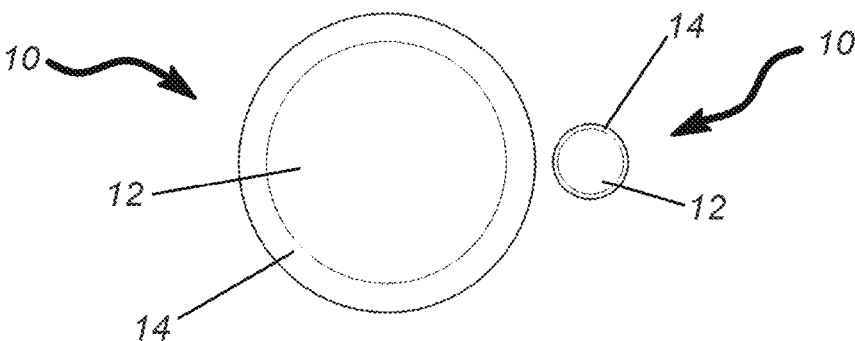

Additionally, the thickness of the shell 14 may be varied, as shown in FIG. 5. In FIG. 5, the smaller particle 10, having the same amount of active material is believed to be able to remove more contaminants compared with the larger particle 10. Thus, a size of the particle 10, a thickness of the shell 14, and amount of active material may be adjusted to obtain a particle 10 with desired selectivity levels.

The shape of the particle 10 may be spherical (FIG. 2) or non-spherical (FIG. 3). Non-spherical shapes include, cylindrical shapes, oblong shapes, ellipsoids, cones, disks, irregularly shaped particles, spherocylinder, ellipsoid, spherotetrahedron and spherocube, to name a few.

Contaminants that the present compositions are contemplated as being useful in removing from liquid streams include ions of cesium, strontium, mercury, silver, lead, transition metals, iodine and, lanthanide and actinide metal ions.

Active Material of the Shell

Exemplary active materials for the shell 14 include, without limitation, a metallotitanate, a metallogermanate, a pillared clay, and/or a metal phosphonate. Examples of metallotitanates include silicotitanates and substituted silicotitanates. For example, the material of the shell 14 may be crystalline silicotitanates (CST) or derivatives or modifications thereof such as substituted crystalline silicotitanates (sCST). Another class of examples of active materials are alkali metal titanates or their protonated/mixed forms, such as mono-, hexa-, octa- and nonatitanates of sodium or potassium to name a few. Ion exchange compositions may also be formed from pillared clays, which are expandable clays that contain pillars between the clay layers. Examples of clays that have ion exchange capacity and can be pillared include montmorillonite, sauconite, nontronite, saponite and hectorite. The pillars may include aluminum chlorhydroxide having a rare earth or zirconium.

Binder

Exemplary materials for the binder include hydroxyl metal oxides, such as zirconium oxides, titanium oxides. "Hydroxy metal oxide" refers to an oxide having the empirical formula $MO_2.xH_2O$ where x ranges from about 2 to about 4 and M is zirconium, titanium, or mixtures thereof.

As noted above, it is contemplated that the binder may be made from a material that also has selectivity to the same contaminant or be active relative to a second contaminant. Thus, the binder can contribute to the activity of the active phase or contribute to the co-adsorption of a secondary contaminant.

Core

The core 12 may be formed from ceramic materials, silica, alumina, titania, zirconia, silicates, zeolites, such as chabazite, clinoptilolite, mordenite or other potential ion exchangers. For example, if the present composition is desired for the removal of strontium ions, then the core 12 may be Zeolite 4A. Zeolite 4A has the following formula: $Na_2O:[AlO_2]_{12}:[SiO_2]_{12}:[H_2O]_{27}$. Alternatively, the present composition may be desired to removal cesium ions. For cesium ion removal, the exemplary the present composition may include a chabazite-type or chabazite-eronite-type zeolite as core 12. An exemplary chabazite-type zeolite is $(K_2O,Na_2O,MgO,CaO)[(Al_2O_3)(SiO_2)_{4-6}].zH_2O$.

It is contemplated that the core 12 may be made from a material that is active relative to a second contaminant. Thus, while the shell 14 removes the first contaminant by ion exchange and adsorbing the first contaminant, the core 12 may remove the second contaminant, also by, for example, ion exchange.

It is also further contemplated that the core 12 may be made from a material that is configured to be subjected to a vitrification process without releasing the first and/or the second ionic contaminants. Thus, the core 12 may be made from a glass-forming material.

The material can be made by methods of adhesion of a shell 14 comprised of the binder and the active phase to the core 12. Alternatively, they active phase can be epitaxially grown on the outside surface of the core 12. Finally, a top layer of the core 12 can be converted by control reaction to a reactive phase in which case there is no change in the size of the particle 10. Examples would be conversion of an outside layer of alumina core 12 to a zeolite or of a titania core 12 to titanates by controlled synthetic conversion.

The present particles 10 are useful as selective ion exchangers. Specifically, the new compositions are useful as selective ion exchangers of various contaminant metal ions from liquid streams such as aqueous streams thereby removing these metal ions from the liquid streams. In general, these metal ions may be removed from the liquid stream by contacting the stream with the particles 10 for a time sufficient to remove the metal ions and trap them on a particle 10. For example, the particles 10 may be placed in a column and the stream to be treated may be flowed through it, usually downflow, until the contaminant metal ion is detected in the effluent of the column. The metal ion containing article can either be disposed of. If the core 12 is of the appropriate material, the contaminated particle 10 can be subjected to a vitrification process.

The present compositions and particles 10 described herein may perform ion exchange in aqueous, highly acidic, neutral, and highly basic solutions, depending on the selection of their components. Further, the present compositions and particles 10 described herein may be formed with selective activities toward the desired ions. In other words, the present compositions and particles 10 may be tuned or adjusted to provide any practical level of activity toward ion exchangeable ions, such as strontium and/or cesium ions.

SPECIFIC EMBODIMENTS

While the following is described in conjunction with specific embodiments, it will be understood that this description is intended to illustrate and not limit the scope of the preceding description and the appended claims.

A first embodiment of the invention is a composition for selectively removing a first ionic contaminant from a wastewater stream, the composition formed into a particle and comprising a core of a non-active material relative to the first ionic contaminant; and, a shell formed from an active material relative to the first ionic contaminant, wherein the active material comprises between 20-50 wt % of the particle. An embodiment of the invention is one, any or all of prior embodiments in this paragraph up through the first embodiment in this paragraph, wherein the shell further comprises a binder. An embodiment of the invention is one, any or all of prior embodiments in this paragraph up through the first embodiment in this paragraph, wherein the shell comprises between 0 to 40 wt % of the binder. An embodiment of the invention is one, any or all of prior embodiments in this paragraph up through the first embodiment in this paragraph, wherein the particle has a median diameter size between 2.1 to 0.4 mm. An embodiment of the invention is one, any or all of prior embodiments in this paragraph up through the first embodiment in this paragraph, wherein the particle has a spherical shape. An embodiment of the invention is one, any or all of prior embodiments in this paragraph up through the first embodiment in this paragraph, wherein the particle has a non-spherical shape. An embodiment of the invention is one, any or all of prior embodiments in this paragraph up through the first embodiment in this paragraph, wherein the shell has a thickness between 20-100 μm. An embodiment of the invention is one, any or all of prior embodiments in this paragraph up through the first embodiment in this paragraph, wherein the first ionic contaminant is selected from a group consisting of cesium, strontium, mercury, silver, lead, transition metal, iodine, lanthanide and actinide metal ions. An embodiment of the invention is one, any or all of prior embodiments in this paragraph up through the first embodiment in this paragraph, wherein the core, or the binder, or both are active relative to a second ionic contaminant in the wastewater stream, the second ionic contaminant different from the first ionic contaminant. An embodiment of the invention is one, any or all of prior embodiments in this paragraph up through the first embodiment in this paragraph, wherein the second ionic contaminant is selected from a group consisting of cesium, strontium, mercury, silver, lead, transition metal, iodine, lanthanide metal, and actinide metal ions. An embodiment of the invention is one, any or all of prior embodiments in this paragraph up through the first embodiment in this paragraph, wherein the core comprises a material configured to be subjected to a vitrification process without releasing the first and/or the second ionic contaminants. An embodiment of the invention is one, any or all of prior embodiments in this paragraph up through the first embodiment in this paragraph, wherein the shell comprises a material selected from a group consisting of metallotitanate, a metallogermanate, a pillared clay, a metal phosphonate, and combinations thereof. An embodiment of the invention is one, any or all of prior embodiments in this paragraph up through the first embodiment in this paragraph, wherein the binder comprises a hydroxyl metal oxide. An embodiment of the invention is one, any or all of prior embodiments in this paragraph up through the first embodiment in this paragraph, wherein the core comprises a material selected from a group consisting of ceramic, silica, alumina, titania, zirconia, silicates, titanates, zeolites, and combinations thereof.

A second embodiment of the invention is a composition for selectively removing a first ionic contaminant from a wastewater stream, the composition formed into a particle and comprising a core of a non-active material relative to the first ionic contaminant; and, a shell formed from an active material relative to the first ionic contaminant and a binder, wherein the shell comprises between 0 to 40 wt % of the binder, wherein the active material comprises between 20-50 wt % of the particle. An embodiment of the invention is one, any or all of prior embodiments in this paragraph up through the second embodiment in this paragraph, wherein the shell comprises between 10 to 30 wt % of the binder. An embodiment of the invention is one, any or all of prior embodiments in this paragraph up through the second embodiment in this paragraph, wherein the binder is active relative to a second ionic contaminant in the wastewater stream, the second ionic contaminant different from the first ionic contaminant. An embodiment of the invention is one, any or all of prior embodiments in this paragraph up through the second embodiment in this paragraph, wherein the core comprises a material configured to be subjected to a vitrification process without releasing the first and/or the second ionic contaminants. An embodiment of the invention is one, any or all of prior embodiments in this paragraph up through the second embodiment in this paragraph, wherein the particle has a median diameter size between 2.1 to 0.4 mm. An embodiment of the invention is one, any or all of prior embodiments in this paragraph up through the second embodiment in this paragraph, wherein the shell has a thickness between 20-100 μm.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A composition for selectively removing a first ionic contaminant from a wastewater stream, the composition formed into a particle and comprising:
   a core of a non-active material relative to the first ionic contaminant, the non-active material selected from a group consisting of: ceramic, silica, alumina, titania, zirconia, silicates, titanates, zeolites, and combinations thereof, and the non-active material forming an innermost portion of the particle; and,
   a shell formed from a binder and an active material relative to the first ionic contaminant,
   wherein the active material comprises between 10 to 50 wt % of the particle,
   wherein the binder comprises hydroxyl metal oxide.
2. The composition of claim 1, wherein the shell comprises between 0.1 to 40 wt % of the binder.
3. The composition of claim 1, wherein the particle has a median diameter size between 0.4 to 2.1 mm.
4. The composition of claim 1, wherein the particle has a spherical shape.
5. The composition of claim 1, wherein the particle has a non-spherical shape.
6. The composition of claim 1, wherein the shell has a thickness between 20-100 μm.
7. The composition of claim 1, wherein the first ionic contaminant is selected from a group consisting of: cesium, strontium, mercury, silver, lead, transition metal, iodine, lanthanide and actinide metal ions.
8. The composition of claim 1, wherein the core, or the binder, or both are active relative to a second ionic contaminant in the wastewater stream, the second ionic contaminant different from the first ionic contaminant.
9. The composition of claim 8, wherein the second ionic contaminant is selected from a group consisting of: cesium, strontium, mercury, silver, lead, transition metal, iodine, lanthanide metal, and actinide metal ions.
10. The composition of claim 8, wherein the core comprises a material configured to be subjected to a vitrification process without releasing the first and the second ionic contaminants.
11. The composition of claim 1, wherein the shell comprises a material selected from a group consisting of: a metallotitanate, a metallogermanate, a pillared clay, a metal phosphonate, and combinations thereof.
12. A composition for selectively removing a first ionic contaminant from a wastewater stream, the composition formed into a particle and comprising:
   a core of a non-active material relative to the first ionic contaminant, non-active material selected from a group consisting of: ceramic, silica, alumina, titania, zirconia, silicates, titanates, zeolites, and combinations thereof, and the non-active material forming an innermost portion of the particle; and,
   a shell formed from a binder and an active material relative to the first ionic contaminant,
   wherein the shell comprises between 0.1 to 40 wt % of the binder,
   wherein the active material comprises between 10 to 50 wt % of the particle.
13. The composition of claim 12, wherein the shell comprises between 10 to 30 wt % of the binder.

14. The composition of claim 13, wherein the binder is active relative to a second ionic contaminant in the wastewater stream, the second ionic contaminant different from the first ionic contaminant.

15. The composition of claim 14, wherein the core comprises a material configured to be subjected to a vitrification process without releasing the first and the second ionic contaminants.

16. The composition of claim 12, wherein the particle has a median diameter size between 0.4 to 2.1 mm.

17. The composition of claim 12, wherein the shell has a thickness between 20-100 μm.

\* \* \* \* \*